Oct. 8, 1929.  R. PERRAULT  1,731,107
RIM LOCKING DEVICE
Filed July 6, 1926
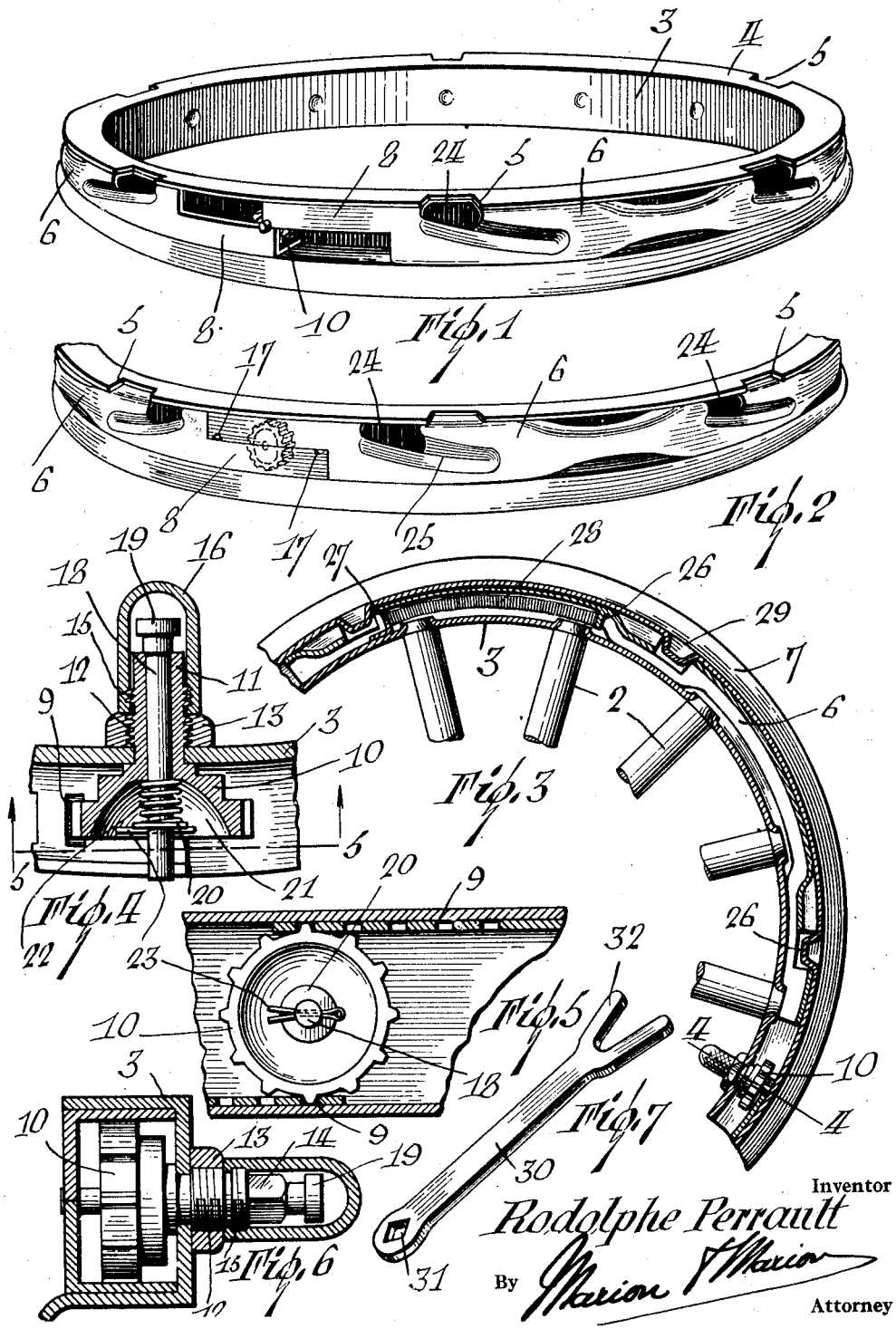
Inventor
Rodolphe Perrault
By
Attorney Patented Oct. 8, 1929

1,731,107

UNITED STATES PATENT OFFICE

RODOLPHE PERRAULT, OF DETROIT, MICHIGAN

RIM-LOCKING DEVICE

Application filed July 6, 1926. Serial No. 120,797.

The present invention pertains to a novel rim locking device of the general type disclosed in my United States Patent No. 1,529,807 of March 17th, 1925, wherein two spring pressed ring sections mounted on the felloe serve to secure lugs carried by the rim.

The principal object of the invention is the provision of an improvement on the device of the above mentioned patent to the effect that the spring pressed sections shall be more easily retained in release position. In the patented device, the release position is maintained by manually passing a pin through the felloe and one of the ring sections. In the present construction, the pin is normally under the pressure of a spring urging it in locking position. The meeting ends of the ring sections are overlapped and formed with apertures which are coincident when the parts are in locking position. At this instant, the spring drives the pin through the apertures and thus automatically secures the release position. When it is desired that the ring sections shall return to locking position, the pin is withdrawn from the apertures by means of a suitable tool.

The locking rings are separated, as in the patented construction, by means of a pinion engaging the overlapped ends. The pinion is provided with a stem which is square in part and adapted to be engaged with a square socket formed also on the above mentioned tool. The locking pin is preferably passed slidably through the stem of the pinion, and the spring for actuating the pin is contained in a recess cut in one of the walls of the pinion.

The invention is fully disclosed in the following description and in the accompanying drawings in which:

Figure 1 is a perspective view of the device in release position;

Figure 2 is a fragmentary perspective view of the device in locking position;

Figure 3 is a fragmentary circumferential section of the device applied to a rim;

Figure 4 is a section on the line 4—4 of Figure 3;

Figure 5 is a fragmentary section on the line 5—5 of Figure 4;

Figure 6 is a section in a plane parallel to Figure 4 and showing the pinion and stem in elevation; and Figure 7 is a perspective view of the tool used for adjusting the device.

Reference to these views will now be made by use of like characters which are employed to designate corresponding parts throughout.

In Figure 3 the numeral 2 engages the spokes of a wheel, on the outer ends of which is mounted a felloe 3. One of the lateral flanges 4 of the felloe is slotted at intervals as at 5 for a purpose pointed out below. Between the side flanges of the felloe and around the circumference thereof are disposed a pair of arcuate locking members 6 constituting a locking ring for a rim 7 surrounding the felloe. The meeting ends of the locking sections are reduced as at 8 and adapted to overlap. They are formed with inwardly projecting racks 9 opposed to one another.

Between the racks, a pinion 10 is mounted in the base of the felloe in such a manner as to engage the two racks. The pinion has a stem 11 projecting into the inner circle of the felloe as shown in Figure 4. The stem is threaded as at 12 near the base of the felloe for the application of a locking nut 13. Adjacent this threaded part is a squared portion 14, and between the parts 12 and 14 are additional threads 15 of smaller diameter than the threads 12. The threads 15 are provided for the attachment of a cap 16 which engages the outer side of the nut 13 and encloses the stem.

The overlapped ends 8 are each formed with a semi-circular aperture 17 which may be brought into coincidence by movement of the pinion in the manner set forth more specifically below. A pin 18 is slidably passed through the stem and pinion and is provided at its outer end with a head 19 for preventing slipping through the pinion. Near the other end of the pin is a disc 20, and the body of the pinion is hollowed as at 21 to accommodate an expansion spring 22 bearing against the disc and the base of the recess 21. The disc 20 is maintained by means of a cotter pin 23 passed diametrically through the pin 18. The outer end of the pin is adapted to enter the apertures 17 when they coincide as shown in Figure 1.

Each of the ring sections is formed with a plurality of recesses 24 corresponding in number to the slots 5 and adapted to register therewith when the sections are in the release position as shown in Figure 2. Adjacent each of the recesses 24, a seat or depression 25 is formed in the member 6 and communicates with the recess, extending towards the opposite edge of the locking member as clearly illustrated in Figures 1 and 2. A substantially square member 26 is cut out of the intermediate portion of each arcuate member and is bent inwardly as shown in Figure 3. To the outer surface of the felloe is secured a fixed stop member 27 spaced from the flange 26 and adapted to engage one end of a spring 28, the other end of which bears against the flange. The rim 7 is formed on its outer surface with a plurality of lugs 29 corresponding in number to the slots 5 and recesses 24.

In use the ring sections tend to assume the position shown in Figure 2 because of the pressure of the springs 28 against the flanges 26. When it is desired to remove a rim or apply a new one, the cap 16 is removed and the pinion 10 is turned to separate the ring sections. The turning of the pinion is performed by the application of a tool 30, having a square socket 31, to the squared portion 14 of the stem. When the ring sections arrive at the position shown in Figure 1, wherein the apertures 17 are coincident, the pin 18 is forced into these apertures by means of the spring 22 as already stated. In this manner the parts are held in release position, with the recesses 24 coinciding with the slots 5, so that the rim may be passed on and taken off the felloe. In this movement, the lugs 29 carried by the rim are accommodated in the slots 5 and recesses 24. In the case of applying a rim, the lugs are allowed to seat in the recesses, and the pin 18 is withdrawn from the apertures 17 by means of the fork 32 at the remaining end of the tool 30. The springs 28 now force the rings together, whereupon the grooved parts 25 move beneath the lugs 27 and draw the rim inwardly upon the felloe. The rim is now locked upon the felloe since the lugs are prevented from lateral shifting by the walls of the seats 25, and from circumferential shifting by the angular position of the seats with reference to a circumferential line around the ring sections.

While a specific embodiment of the invention has been illustrated and described, it is to be undertsood that various alterations in the details of construction may be made without departing from the spirit of the invention as indicated by the appended claims.

Having thus fully described the invention what I claim as new and desire to protect by Letters Patent is:

1. A rim locking device comprising in combination with a felloe, a pair of arcuate locking sections disposed on the circumference thereof, springs actuated on said sections and adapted to force them together, said sections having their meeting ends overlapped and formed with apertures adapted to coincide, a pinion journaled in said felloe, said ends being adapted for engagement by said pinion, and a pin slidably mounted in said pinion and adapted to enter said apertures when coincident.

2. A rim locking device comprising in combination with a felloe, a pair of arcuate locking sections disposed on the circumference thereof, springs actuated on said sections and adapted to force them together, said sections having their meeting ends overlapped and formed with apertures adapted to coincide, a pinion journaled in said felloe, said ends being adapted for engagement by said pinion, a pin slidably mounted in said pinion and adapted to enter said apertures when coincident, and a stem extending from said pinion through said felloe, a portion of said stem being adapted for engagement by a turning tool.

3. A rim locking device comprising a pair of arcuate rim sections adapted to be arranged in complementary circular formation, means adapted to normally urge the said sections together, said sections having their meeting ends formed with complementary overlapping end portions, the inner adjacent side of each end portion being provided with a semi-circular aperture adapted to coincide to form a circular opening when the sections are expanded, means for separating the sections, and a spring pressed pin adapted to engage the semi-circular apertures when arranged in coinciding positions to lock the sections in separated position.

In witness whereof I have hereunto set my hand.

RODOLPHE PERRAULT.